United States Patent
Bartley et al.

(10) Patent No.: US 10,609,894 B1
(45) Date of Patent: Apr. 7, 2020

(54) TACK ROOM CURTAIN HANGING APPARATUS, SYSTEM AND METHOD

(71) Applicants: Brett William Bartley, Baldwin City, KS (US); Patricia McCoy Bartley, Baldwin City, KS (US)

(72) Inventors: Brett William Bartley, Baldwin City, KS (US); Patricia McCoy Bartley, Baldwin City, KS (US)

(*) Notice: Subject to any disclaimer, the term of this patent is extended or adjusted under 35 U.S.C. 154(b) by 191 days.

(21) Appl. No.: 15/826,777

(22) Filed: Nov. 30, 2017

Related U.S. Application Data (60) Provisional application No. 62/428,432, filed on Nov. 30, 2016.

(51) Int. Cl.

| | |
|---|---|
| *A01K 1/00* | (2006.01) |
| *E04H 15/14* | (2006.01) |
| *E04H 1/12* | (2006.01) |
| *E04B 1/38* | (2006.01) |
| *A47H 1/06* | (2006.01) |
| *E04H 15/44* | (2006.01) |
| *E04B 1/343* | (2006.01) |

(Continued)

(52) U.S. Cl.
CPC ............ *A01K 1/007* (2013.01); *A01K 1/0035* (2013.01); *A01K 1/0094* (2013.01); *A47H 1/06* (2013.01); *A47H 1/144* (2013.01); *E04B 1/34384* (2013.01); *E04B 2/80* (2013.01); *E04H 1/1272* (2013.01); *E04H 15/44* (2013.01); *E04B 2001/405* (2013.01)

(58) Field of Classification Search
CPC .... A01K 1/007; A01K 1/0035; A01K 1/0094; E04H 1/1272; E04H 15/44; E04B 1/34384; E04B 2/80; Y10S 160/08; A47H 1/00; A47H 1/14; A47H 1/144; A47H 23/00; E06B 3/80; E06B 5/025
USPC ........... 52/36.1, 63, 79.5; 119/436, 519, 524
See application file for complete search history.

(56) References Cited

U.S. PATENT DOCUMENTS 2,931,129 A * 4/1960 Boniface .............. A63H 33/101
446/126
3,462,021 A * 8/1969 Hawke ...................... A47F 5/14
211/182

(Continued)

FOREIGN PATENT DOCUMENTS

DE      19946399 A1 * 4/2001 ........... A01K 1/0035
JP      3181317 U  *  1/2013 ............... A47H 2/00

*Primary Examiner* — Robert Canfield
(74) *Attorney, Agent, or Firm* — Frederic Dorwart, Lawyers PLLC; Penina Michlin Chiu (57) ABSTRACT

A tack room curtain hanging apparatus, system and method. A system for hanging display curtains includes a display curtain hung on a display curtain frame including a door frame, a plurality of horizontal planks and a plurality of vertical planks coupled together by a set of brackets to form the display curtain frame, the set of brackets including a tee bracket and a corner bracket, the tee bracket including a horizontal socket mated to an end of a particular one of the plurality of horizontal planks, and a vertical socket mated to a top end of a particular one of the plurality of vertical planks, the top end aligned with a bottom of the horizontal socket, a first single fastener coupling the top end of the vertical plank to the vertical socket, and a second single fastener coupling the end of the horizontal plank to the horizontal socket.

14 Claims, 7 Drawing Sheets

(51) Int. Cl.
*E04B 2/80* (2006.01)
*A47H 1/144* (2006.01)

(56) References Cited

U.S. PATENT DOCUMENTS

| | | | | |
|---|---|---|---|---|
| 3,740,084 | A * | 6/1973 | Tellberg | B63C 15/00 403/171 |
| 3,836,270 | A * | 9/1974 | Chambers | E04B 1/2604 403/218 |
| 4,076,431 | A * | 2/1978 | Burvall | E04B 1/2604 403/171 |
| 4,355,725 | A * | 10/1982 | Humphrey | E04B 1/2604 211/182 |
| 4,854,531 | A * | 8/1989 | Esposito | B25H 1/04 248/165 |
| 4,885,883 | A * | 12/1989 | Wright | E04B 1/2604 52/280 |
| 4,910,939 | A * | 3/1990 | Cavanagh | E04B 1/2604 403/171 |
| 9,995,034 | B2 * | 6/2018 | Rothenberg | E04B 1/34384 |
| 2006/0193687 | A1 * | 8/2006 | Ghosh | E04B 1/26 403/401 |
| 2006/0213546 | A1 * | 9/2006 | Mitsui | E04H 15/42 135/121 |
| 2011/0179741 | A1 * | 7/2011 | Yen | E04B 1/34326 52/653.1 |
| 2011/0308063 | A1 * | 12/2011 | Feeleus | E04B 1/26 29/525.01 |
| 2013/0276382 | A1 * | 10/2013 | Workman | E04H 15/44 52/63 |
| 2018/0135295 | A1 * | 5/2018 | Bowron | E04B 1/34838 |
| 2018/0238041 | A1 * | 8/2018 | Styrc | E04B 1/1912 |

* cited by examiner fig.1 fig.2

TACK ROOM CURTAIN HANGING APPARATUS, SYSTEM AND METHOD

CROSS REFERENCE TO RELATED APPLICATIONS

This application claims the benefit of U.S. Provisional Application No. 62/428,432 to Bartley et al., filed Nov. 30, 2016 and entitled "TACK CURTAIN HANGING APPARATUS, SYSTEM AND METHOD," which is hereby incorporated by reference in its entirety.

BACKGROUND OF THE INVENTION

1. Field of the Invention

Embodiments of the invention described herein pertain to the field of display curtains for forming a temporary tack room. More particularly, but not by way of limitation, one or more embodiments of the invention enable a tack room curtain hanging apparatus, system and method.

2. Description of the Related Art

Horse and stable owners often travel with their horses to horse shows, such as judged exhibitions or competitions, which take place in various locations. Horse shows can run from 1 to 3 days on average but large shows can run for as long as 10-15 days and consist of a series of different performances, where groups of horses having similar characteristics compete for awards or prize money. Many professional trainers will take students to shows most weekends of the year, travelling what is called a "circuit" of horse shows. A few types of horse show competitions include hunters, jumpers, dressage, driving and vaulting, among many others.

Since a stable may wish to compete in a horse show that is not local, the equipment to care for the competitors must travel with them to the show location. Horse accessories and equipment are known as "tack" and include items such as saddles, stirrups, bridles, halters, reins, bits, harnesses, saddle pads and cloths, girth protectors and breastplates. In a more casual manner, "tack" may also refers to equipment used to manage and care for horses such as grooming equipment, halters, lead lines, lunge lines, blinkers, horse boots, shin protectors, leg wrapping materials, blankets, wash sheets and fly hoods. "Tack" is often stored in a tack room, generally on particularly shaped hooks and hangers. "Tack" may often also be stored and transported in a tack trunk.

Large stables (commonly called a "barn") with well-known trainers may often travel to various horse shows many weekends of the year. When a barn travels, its horses, trainers, riders, grooms, and all their equipment must travel with them. To protect the health of horses at the local barn where a horse show is held, horses traveling into the show are often kept in "show barns." "Show barns" may be temporary stalls on the show grounds where each visiting barn will be assigned a number of stalls to accommodate their horses, with a few spare for storing tack, feed, and equipment.

Most trainers wish to advertise their barn's location in the show barns to people visiting the horse show. Many trainers and barns choose a set of colors and a logo to represent them. Tack trunks, equipment, jackets and other materials may be branded with the barns' colors and logo. Some barns hang all the ribbons won by their ridders outside their show barn stalls to show the success of their students. Thus, their show barn branded location acts as a form of advertising for the trainers stationed there during shows.

Each stable typically sets up one or more temporary tack rooms at each horse show in order to store equipment and use as a changing room. Often, temporary tack rooms may be created by erecting custom-built wooden frames around metal stalls. Curtains are hung on the wooden frames. Besides concealing the equipment and providing a changing location for the riders, the curtains are also branded with the barn's colors and logo, and are thus also used to advertise the barn or trainer.

Since tack rooms created by curtains are temporary enclosures for traveling horses, a problem arises because they constantly need to be erected as the barn moves, then taken down, transported and rehung at the next show. Conventionally, a wooden frame is built around a stall, with planks of wood being custom-cut to fit a particular stall. An additional challenge is that stalls in show barns are not always the same size, making it difficult to reuse wooden frames from one show to the next. Once the wooden frame is built to size, the tack room curtains are attached to the wooden frame. Typically, depending on the number of stalls covered, this process takes 4 to 8 hours at small shows and as long as several days at large shows to build the frame and hang curtains, which is considered extremely labor intensive. As the curtains serve in part as a form of advertising, it is important that they hang straight, crisp and tight in appearance. However, quickly constructed wooden frames make it difficult to hang the curtains well, especially when the size and shape of the curtain frame changes from show to show.

For at least the past 30 years, the most common question asked of tack curtain manufacturers is: "how do I hang the curtains?" Conventionally, there has not been a sufficient way to join the lumber to hang stall curtains.

As is apparent from the above, currently available tack curtain hanging systems and methods suffer from many deficiencies. Therefore, there is a need for an improved tack curtain hanging apparatus, system and method.

BRIEF SUMMARY OF THE INVENTION

One or more embodiments of the invention enable a tack curtain hanging apparatus, system and method.

A tack room curtain hanging apparatus, system and method is described. An illustrative embodiment of a system for hanging display curtains includes a display curtain hung on a display curtain frame, the display curtain frame including a door frame, a plurality of horizontal planks and a plurality of vertical planks, the plurality of horizontal planks and the plurality of vertical planks coupled together by a set of brackets to form the display curtain frame, the set of brackets including a tee bracket and a corner bracket, the tee bracket including a horizontal socket mated to an end of a particular one of the plurality of horizontal planks, and a vertical socket mated to a top end of a particular one of the plurality of vertical planks, the top end aligned with a bottom of the horizontal socket, a first single fastener coupling the top end of the vertical plank to the vertical socket, and a second single fastener coupling the end of the horizontal plank to the horizontal socket. In some embodiments, the corner bracket is a double corner bracket, and the vertical socket mates with two vertical planks, each plank of the two vertical planks arranged normally to one another. In certain embodiments, the set of display curtain hanging brackets further includes an overhead banner bracket. In some embodiments, the display curtain frame extends around a tack room stall. In certain embodiments, the system further includes a shim between the particular one of the plurality of vertical planks and the tack room stall. In some embodiments, the set of brackets includes two tee brackets forming the door frame, each tee bracket of the two tee brackets mated to a vertical plank of the plurality of vertical planks, wherein one horizontal plank of the plurality of horizontal planks mates with and extends between each of the two tee brackets. In certain embodiments, each vertical plank of the plurality of vertical planks is about 92 inches long, and wherein the display curtain is 8 feet high when hanging. In some embodiments, the set of brackets are made of rotationally molded polyethylene. In certain embodiments, the first fastener is a self-piercing lath screw engaged through a hole in the vertical socket.

An illustrative embodiment of a curtain hanging method includes inserting a first vertical board into a first vertical socket of a first bracket from below the first bracket until a top end of the first vertical board is aligned with a bottom of a first horizontal socket extending through the first bracket, affixing the first vertical board loosely to a stall, repeating the inserting and the affixing with a second vertical board into a second vertical socket of a second bracket, the second bracket including a second horizontal socket, sliding a horizontal board through the first and second horizontal sockets, securing the top end of the first vertical board, the top end of the second vertical board and each side of the horizontal board to one of the first bracket or the second bracket using a single fastener, and hanging a curtain over the horizontal board. In some embodiments, the curtain hanging method further includes attaching the curtain to the horizontal board with an attachment means. In certain embodiments, a bottom of the first vertical board is seated in an end bracket. In some embodiments, the first bracket and the second bracket are tee brackets. In certain embodiments, the first bracket is a tee bracket and the second bracket is a double corner bracket. In some embodiments, the curtain hanging method further includes shimming the first and second vertical boards and affixing the first vertical board and the second vertical board loosely with zip ties. In certain embodiments, the horizontal board forms a top rail of a frame. In some embodiments, hanging the curtain over the horizontal board further includes forming a frame around a tack stall with the vertical boards and the horizontal board, and hanging the curtain around the tack stall on the frame.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A tack room curtain hanging apparatus, system and method is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a bracket includes one or more brackets.

As used in this specification and appended claims, the terms "curtain," "tack curtain," "tack room curtain," "drapes," "display drapes," "tent," or other similar terms, including plural referents, for horse show display curtains are used interchangeably unless the context clearly dictates otherwise.

As used in this specification and appended claims, the terms "plank," "board," "beam," "1×4," "2×4," "1×2," including plural referents, or other similar boards of any wood variety readily available near horse shows are used interchangeably unless the context clearly dictates otherwise.

As used in this specification and appended claims, the terms "socket," "opening," "bracket socket," "bracket opening," and similar terms including plural referents, are used interchangeably unless the context clearly dictates otherwise.

Illustrative embodiments are described in terms of tack room curtain hanging equipment. However, the invention is not so limited and may be applied to any temporary or semi-permanent frame supporting reusable display curtains.

For example, the system, apparatus and method of illustrative embodiments may be employed at trade show booths, dressing rooms, agricultural stalls for sheep, cattle or other agricultural purposes, circuses, dog shows (particularly benched trials such as Westminster), cat shows (where display is part of what is judged), county fairs where 4H and FFA children display their farm animals for judging, horseracing barns and any temporary or other similar curtain-hanging applications.

Illustrative embodiments provide an improved system, apparatus and method for hanging tack room curtains that may be simple, quick and efficient to assemble, disassemble, move to a new location, and then reassemble. Illustrative embodiments may allow tack room curtains to hang crisp, neat and tight despite varying stall sizes and zipper door locations. Display curtains of illustrative embodiments may be hung by two people in as few as two hours, and the boards for the curtain frames may be reused from location to location. Illustrative embodiments may create strong supportive joints that may be fastened using a few screws and may allow a user to re-use boards from one show to another since minimal cuts to the planks are required once the curtain hanging system of illustrative embodiments is assembled.

One or more illustrative embodiments may be, for example, made from rotationally molded polyethylene, though nothing limits the invention to this particular exemplary embodiment. The invention may be implemented in any material with the strength and durability to provide the support to the curtain and planks including metal, wood, ceramic, or other types of plastic. Information about an exemplary polyethylene material that may be employed to manufacture the brackets of illustrative embodiments are well known to those of ordinary skill in the art of bracket formation. The illustrative brackets may include corner brackets, a 90 degree bottom corner bracket, a tee bracket, an end bracket and/or an overhead banner bracket. The brackets may be hollow and have sockets to receive wooden boards to form a frame. Each bracket may slide and/or secure around both a vertical board and a horizontal board to form a 90° joint (a 90 degree corner bracket, a double corner bracket, a tee bracket or an overhead banner bracket), a line that continues along the same direction past a vertical post, such as to create a door frame (tee bracket), or form two 90° angles adjacent to one another to form a corner (double corner bracket). The brackets may each be secured in place by a single fastener such as a self-piercing lath screw or a lap screw. Once the frame is assembled in the desired shape to fit around a particular stall, then display curtains may be fastened, such as with staples, to the top rails to enclose a tack room or other space at a horse show while also providing an attractive display that brands a particular stable, trainer or barn.

Figure 1:
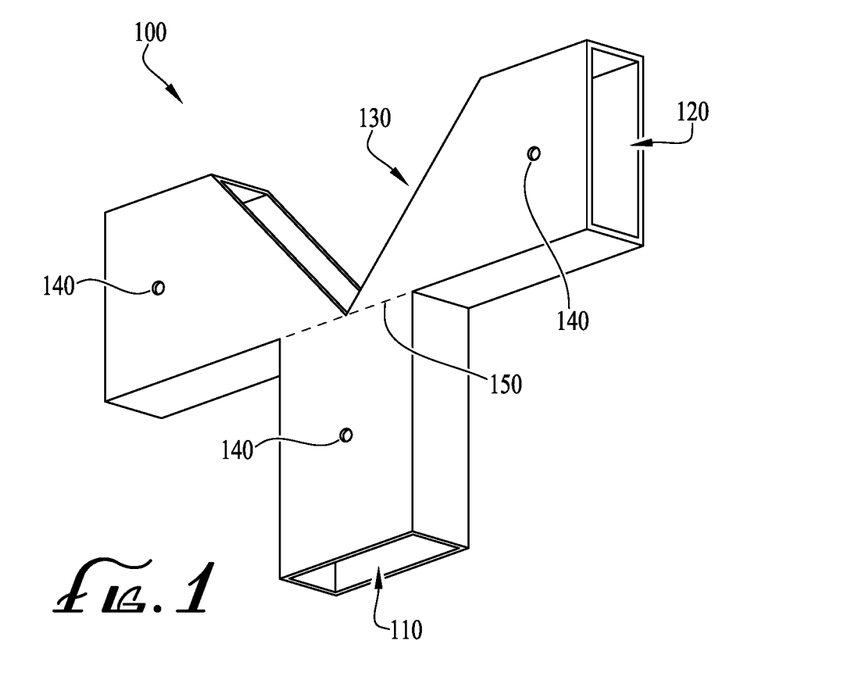
FIG. 1 is a perspective view of a tee bracket of an illustrative embodiment.

The system of the illustrative embodiment includes a set of display curtain hanging brackets, the set including a corner bracket, a 90-degree bottom corner bracket, a tee bracket, an end bracket, and an overhead banner bracket. FIG. 1 illustrates a tee bracket 100 of the set of illustrative brackets. Tee bracket 100 may be used to intersperse a vertical board into the curtain-hanging frame when additional vertical support is desired and there is no corner (where the stall continues along past the bracket in the same direction). In this way, tee bracket 100 may form a "T" shape with the vertical and horizontal boards. Tee brackets 100 may, for example, be used to support the installation of a zipper door in a tack room display curtain frame and/or may allow insertion of a vertical board to provide structural support for horizontally elongated frames.

Figure 6:
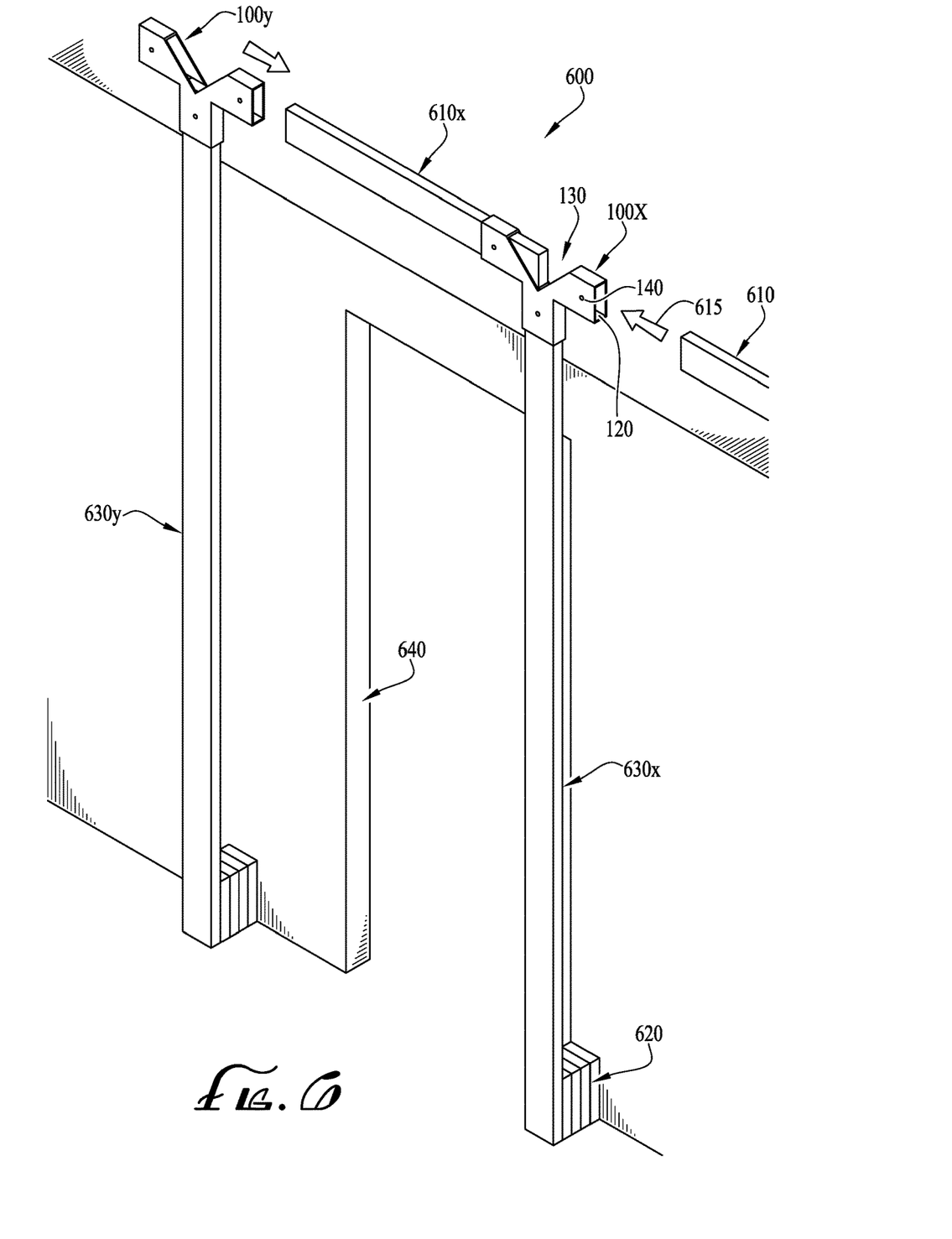
FIG. 6 is a perspective view of a method of joining planks and tee brackets to form a door frame for a tack room display curtain-hanging frame of an illustrative embodiment.

FIG. 6 illustrates a construction of a door frame in an illustrative embodiment. In FIG. 6, door frame 600 is formed by two tee brackets 100x, 100y, which join two vertical planks 630x, 630y and a plurality of horizontal planks 610, 610x to form door frame 600. Door frame 600 may allow curtain door 810 (shown in FIG. 8) to be hung in front of stall doorway 640. Shims 620 may be used to support the door frame 600 around stall doorway 640 hardware and/or to fit and/or align door frame 600 with doorway 640. Tee bracket 100x, 100y is joined to and/or forms door frame 600 of a tack room curtain-hanging frame when vertical plank 630x. 630v has been inserted into vertical socket 110, and then horizontal plank 610 is inserted into horizontal socket 120, for example as illustrated by arrow 615. Two separate horizontal planks 610, 610x may be joined in each tee bracket 100 by bringing their ends together in gap 130, or a single horizontal plank 610 may pass all the way through socket 120 to the corresponding socket on the other side of tee bracket 100. Other uses for tee bracket 100 will be well understood by those of ordinary skill in the art.

Figure 2:
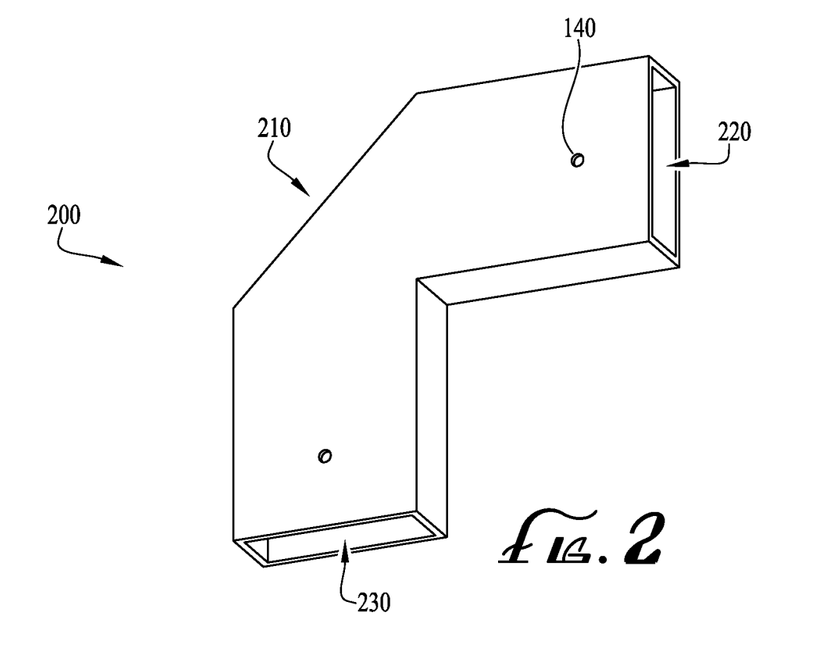
FIG. 2 is a perspective view of a two-dimensional corner bracket of an illustrative embodiment.
Figure 7:
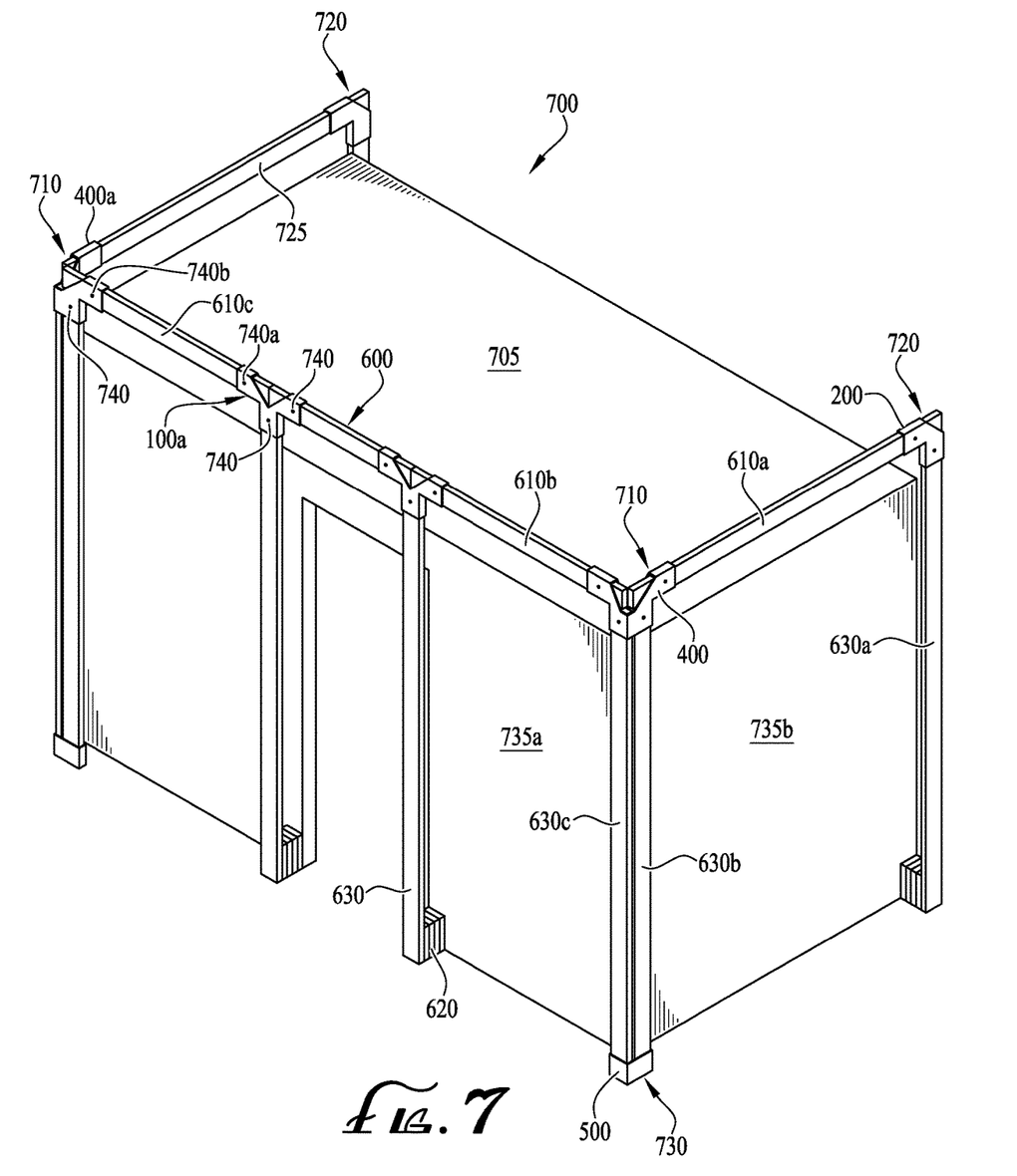
FIG. 7 is a perspective view of a completed tack room display curtain hanging frame installed around one stall in an illustrative embodiment.

FIG. 2 illustrates corner bracket 200 of illustrative embodiments. Corner bracket 200 may form a 90 degree angle in a single plane and be useful when making "two-dimensional" corner 720 of frame 700 (shown in FIG. 7) that may connect two planks 610, 630 normally to form a corner in one plane (two dimensions). As shown in FIG. 7, corner bracket 200 connects horizontal plank 610a with vertical plank 630a to form a corner of side 735b of frame 700. Thus, corner bracket 200 may form a corner of a single side 735 of frame 700. Vertical post socket 220 may receive vertical plank 630 and horizontal socket 230 may receive horizontal plank 610 when a bottom rail and/or top rail 725 for frame 700 is desired. Corner bracket angle opening 210 allows for easy alignment of the horizontal 610 and vertical planks 630 to form a neat and square two-dimensional corner 720. Other uses for 90 degree bottom corner bracket 200 will be well understood by those of ordinary skill in the art. FIG. 7 shows the use of corner bracket 200 in two-dimensional corner 720 of on top rail 725 of completed frame 700.

Figure 3:
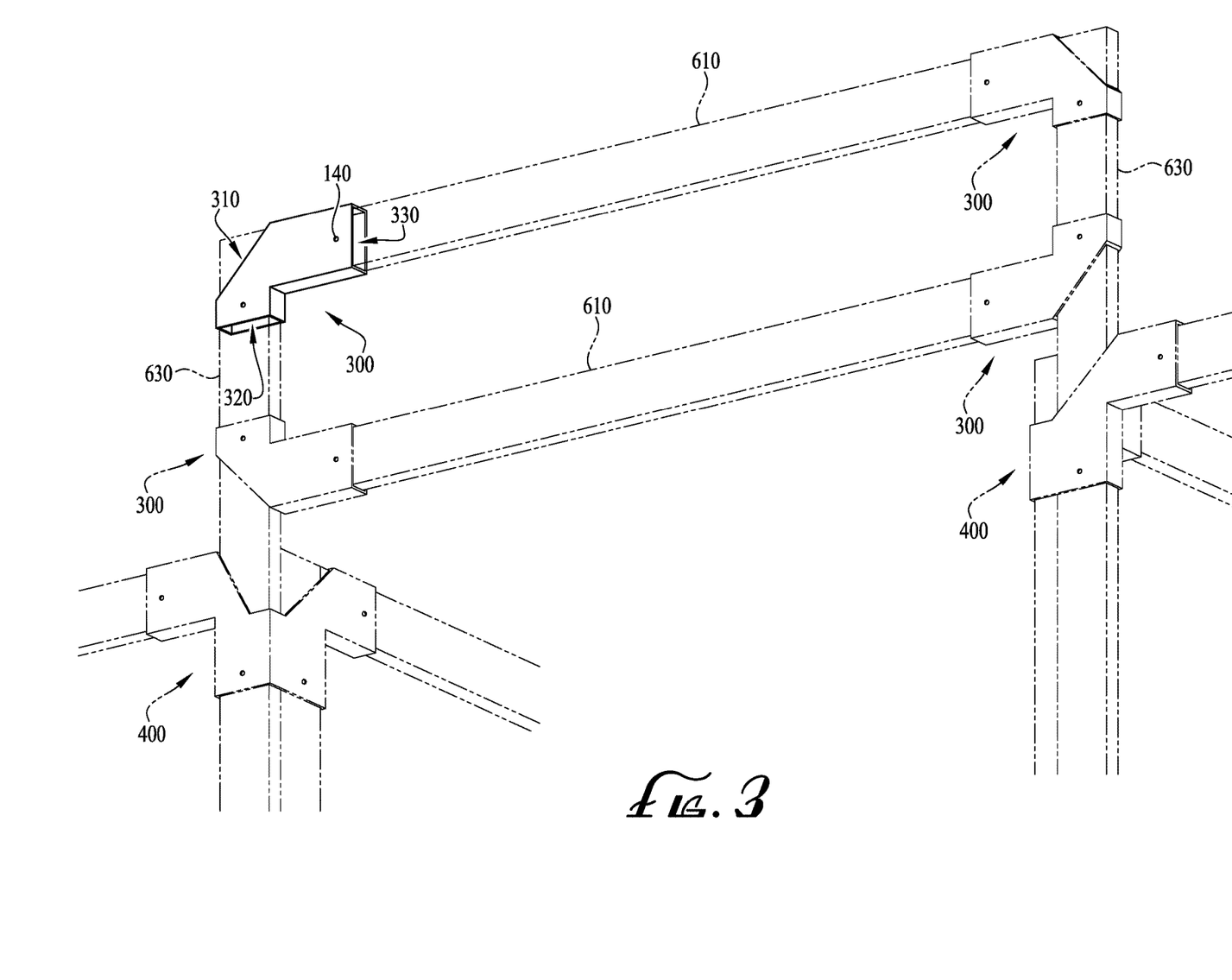
FIG. 3 is a perspective view of an overhead banner bracket of an illustrative embodiment.

FIG. 3 illustrates an overhead banner bracket 300. Four overhead banner brackets 300 may be used with two horizontal planks 610 and two small (e.g., 1 ft. high as opposed to 8 ft. high) vertical planks 630 to form a frame for a display curtain banner to hang spanning the shed row or stall aisle (not shown). Banner bracket angle opening 310 allows for the proper alignment of horizontal planks 610 (inserted in socket 330) and vertical planks 630 (inserted into socket 320) to form a banner shaped frame using overhead banner bracket 300. Other uses for overhead banner bracket 300 will be well understood by those of ordinary skill in the art.

Figure 4:
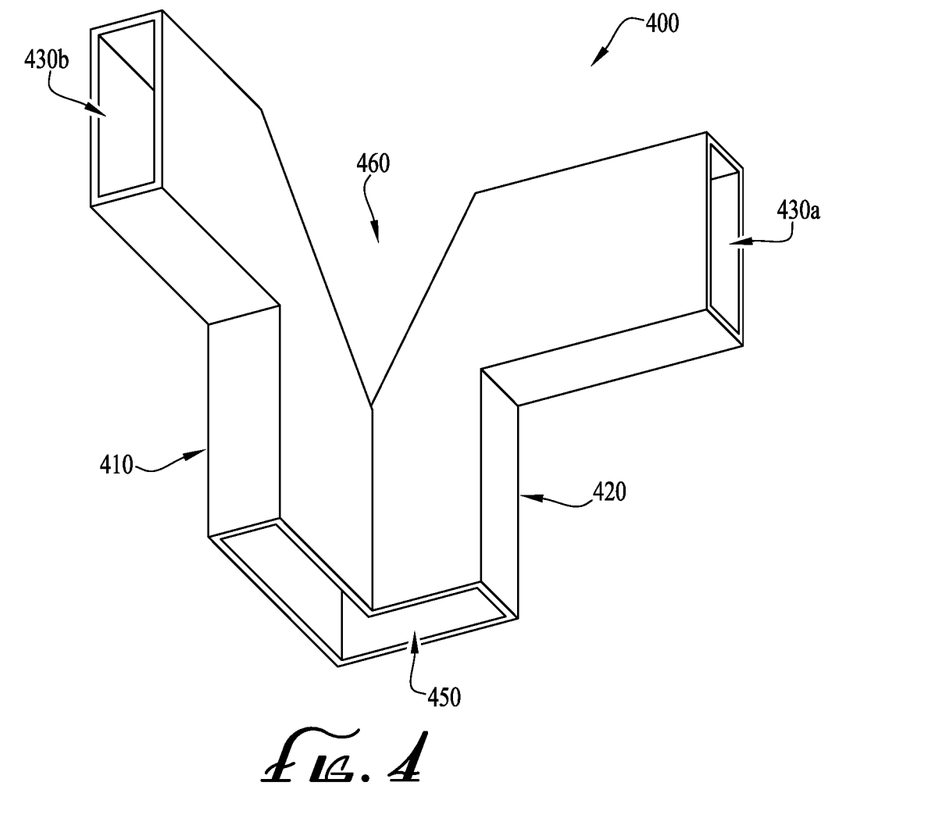
FIG. 4 is a perspective view of a double corner bracket of an illustrative embodiment.

Turning to FIG. 4, double corner bracket 400 may be used in an illustrative embodiment to form an upper or lower three-dimensional corner of display curtain hanging frame 700, where the corner connects two adjacent and/or normal sides 735 of frame 700. Double corner bracket 400 may form dual-plane corner 710 and/or be employed where a corner occurs at the intersection of two adjacent and/or normal sides 735 of frame 700. As shown in FIG. 7, double corner bracket 400 joins horizontal planks 610a and 610b to form a corner on top rail 725, forms a corner between horizontal plank 610a and vertical plank 630b, to form a portion of side 735b of frame 700, and also forms a corner between horizontal plank 610b and vertical plank 630c to form a portion of side 735a of frame 700, where sides 735a and 735b are normal and/or perpendicular to one another.

FIG. 7 illustrates an exemplary double corner bracket 400 forming an upper corner of display curtain hanging frame 700. Double corner bracket 400 may be used as in joint 710 to support frame 700 around the corner of a stall joining two stall sides 735. In such an embodiment, two vertical planks 630*b* and 630*c* may both be inserted into socket opening 450 such that one vertical plank 630*b* is received by side 410 and the second vertical plank 630*c* is received by side 420, both through socket opening 450 normally to one another to form the vertical portion of the joint 710 of frame 700. Horizontal plank 610*a* may be inserted into horizontal socket 430*a*, while horizontal plank 610*b* from the adjacent side of the stall may then be inserted into horizontal socket 430*b* to form a 90 degree angle between horizontal planks 610 on top rail 725. Open angle 460 allows for the easy precise alignment of the horizontal planks 610 and vertical planks 630 to form a square "three-dimensional" corner supportive of a neat and tight display curtain hanging frame 700. Other uses for corner bracket 400 will be well understood by those of ordinary skill in the art.

Figure 5:
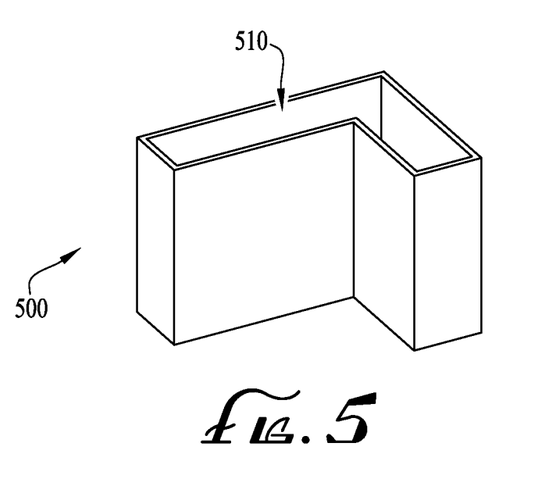
FIG. 5 is a perspective view of an end bracket of an illustrative embodiment.

End bracket 500 illustrated in FIG. 5 shows a receptacle 510 for receiving two separate vertical boards 630 arranged perpendicularly to one another, such that end bracket 500 can form a foot for frame 700 where a bottom horizontal rail 610 is not desired. In FIG. 7, end bracket 500 is shown at foot 730 of frame 700. As illustrated, foot 730 forms a corner between vertical rail 630*b* and vertical rail 630*c*, but no horizontal rails 610 extend from foot 730. Other uses for end bracket 500 will be well understood by those of ordinary skill in the art.

Some or all vertical planks 630 in the system may require shims 620 to support, wedge, fit and/or align frame 700 around floor features or hardware of the stall. All vertical planks 630 and horizontal planks 610 in the system may be attached to their receiving bracket with as few as one fastener 740 per attachment. For example, as shown in FIG. 7, horizontal plank 610*c* is attached into horizontal socket 120 of tee bracket 100*a* by fastener 740*a*, and is attached into horizontal socket 430 of double corner bracket 400*a* by fastener 740*b*. Fasteners 740*a*, 740*b* and brackets 100*a* and 400*a* are the only elements holding horizontal plank 610*c* securely in place in frame 700, allowing for simple and efficient erection and take-down of frame 700. Fasteners 740 such as self-piercing lath screws, lap screws or nails, for example, may be used with the brackets of illustrative embodiments. One fastener 740 per board may be applied to any bracket as illustrated herein, such as for example installing a lath screw into each of hole 140 of bracket 100. One of ordinary skill in the art will understand that such fasteners and fastener holes may be used in any of the brackets described herein at illustrated for FIG. 1.

FIG. 7 illustrates one embodiment of a complete display curtain hanging frame around a horse stall without bottom rails. In this embodiment, frame 700 is supported at the upper corners by double corner brackets 400 (shown at joint 710), whereas the back of frame 700 (the wall opposite door frame 600) is supported in the upper corners by a 90 degree corner bracket 200 as shown at corner 720. FIG. 7 also illustrates the formation of an exemplary door frame 600 for attaching a door such as a zipper door and/or curtain door 810 in the tack room display curtains 815 (shown in FIG. 8). FIG. 7 also shows the use of end brackets 500 at foot 730. One of ordinary skill in the art will quickly understand how stalls of different configuration can also be framed by the brackets 100, 200, 300, 400 and/or 500 shown in these exemplary illustrations. The sockets of each bracket shown herein have rectangular cross sections, however, sockets of varying cross-sectional shapes, such as square or round, may be employed so as to accommodate the shape of the planks received by the sockets. Generally, the ends of planks, for example the end 6-10 inches of a plank, may rest within bracket sockets of a completed frame 700, depending on the length of the planks and the shape of the frame. In some embodiments, a middle portion of a plank may extend through a bracket, rather than an end of the plank.

Figure 8:
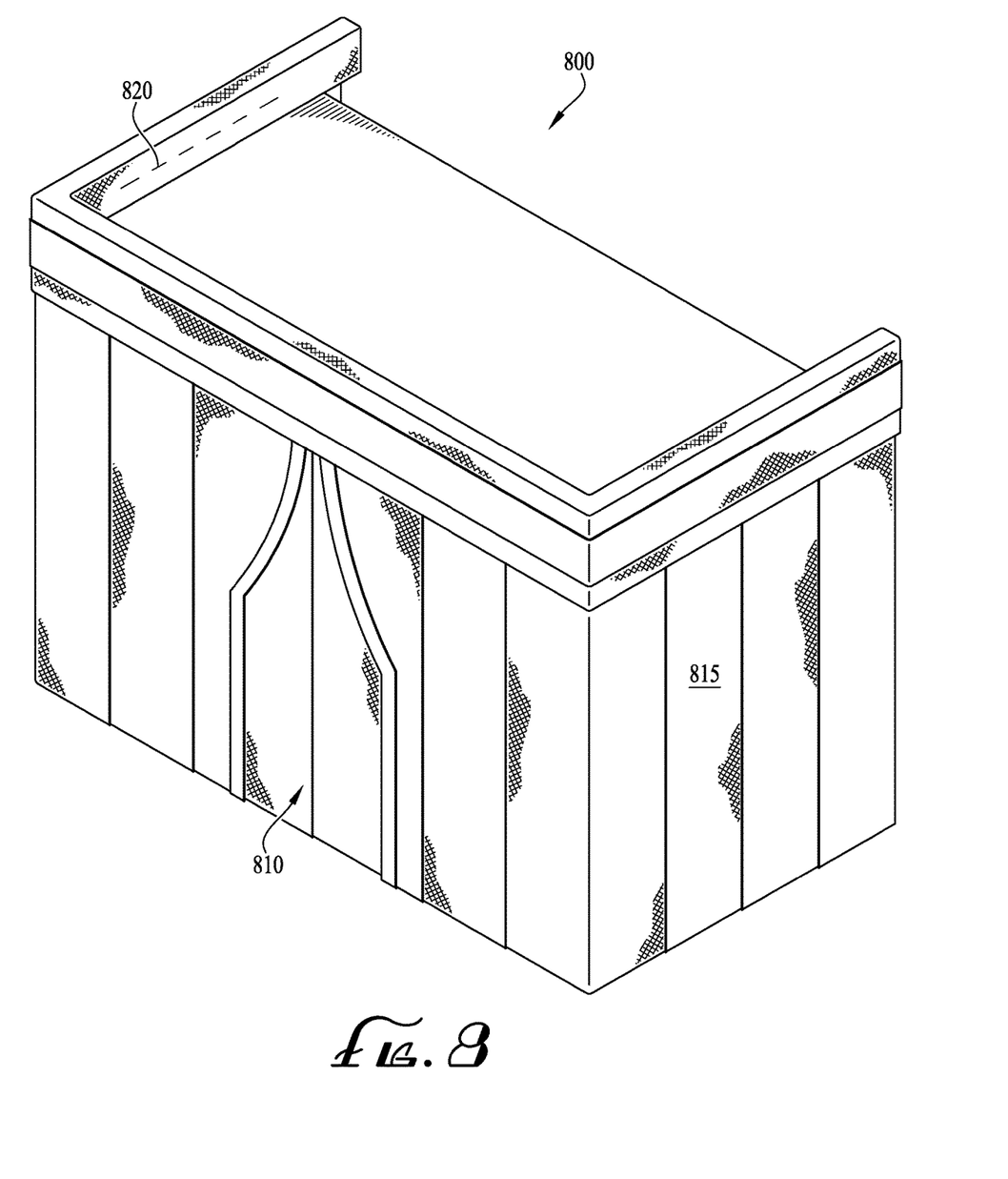
FIG. 8 is a perspective view of a completed tack room display curtain system installed around one stall in an illustrative embodiment.

FIG. 8 shows a complete set of tack room display curtains hung on frame 700 to form completed tack room 800. Curtain door 810 corresponds to door frame 600. Curtains 810 may be attached to frame 700 by securing and/or hanging curtains 815 to top rail 725 of frame 700. Curtains 810 may be secured to frame 700 with non-permanent attachment means 820 such as nails, screws, staples, Velcro, plastic zip tie and/or metal ties. When enclosed by curtains 815 as shown in FIG. 8, the complete set of tack room display curtains 810 hung on frame 700 forms a private barrier where equipment can be stored while presenting a neat appearance to anyone visiting the barn during a horse show, for example. It also provides privacy to any rider, groom, or other employee who needs a clean place to change into or out of their riding clothes or working clothes. Sometimes during an event, a competitor may need a place to relax in private and the complete set of tack room display curtains 815 hung on frame 700 also provides this to those competitors. As an advertising or branding tool, the complete set of tack room display curtains 815 hung on frame 700 provides a trainer or barn with a professional appearance that lets any potential student know that this organization is top tier and competitive. Finally, the complete set of tack room display curtains 815 hung on frame 700 provides an attractive location for displaying the winning ribbons of the barn, showing the competition on potential future clients that this barn is a successful enterprise.

The dimensions of frame 700 of illustrative embodiments may be quickly and easily adapted for different sizes, numbers, and/or dimensions of stalls 705 being draped with curtains 815. In some cases, for example, the height of each stall 705 may be standard from one show to another such that each vertical board 630 may not require cutting or modification (for example using 92 inch vertical boards 630). Each horizontal board 610, however, may be cut and/or slide within a bracket in order to vary the size and/or dimensions of frame 700. For example, horizontal sockets 120 and gap 130 of tee bracket 100 may allow several different positions of horizontal plank 110 as horizontal plank 110 slides towards, away from and/or into gap 130, allowing for several inches of leeway for each plank positioned within socket 120 of bracket 100. Other types of brackets may be employed in a similar fashion to adjust plank positioning. Those of skill in the art will appreciate that frame 700 may be formed with four sides, instead of three, by replacing corner brackets 200 with double corner brackets 400, for example. Similarly additional walls and/or geometric features may be added using additional combinations of brackets. In some embodiments, open angle 460 of double corner bracket 400 may be an angle other than 90° so as to allow frame 705 to have more complex shapes. In such instances, horizontal sockets 430*a*, 430*b* may be angled away from 90°, while vertical socket 450 may remain right angled in order to allow vertical planks 630 to fit, sit, and/or secure inside bracket 400. In some embodiments, tee brackets 100 may be flipped 90° in order to secure a single horizontal beam 610 perpendicularly to a straight-line-connected pair of vertical beams 630, for example, to provide additional surfaces on frame 700 various faces on which to hang curtains 800.

In order to accommodate the space needed for stall 705's doors to actuate, for example when employing a hinged and/or pivoting door of stall 705, door frame 600 may be separated from stall 705 by a clearance, which clearance may be retained and/or initially established using shims 620. Door frame 600 and/or curtain door 810 may be placed using vertical boards 630 and tee brackets 100. Tee bracket 100 may initially be loosely installed to allow for minor adjustments to curtain door 810's location, thus ensuring sufficient space for entry and exit into stall 705. In some cases, vertical boards 630 may also be further shimmed to clear rolling doors of stalls 705. Newer facilities may have heavy-duty stall door hardware that may require a greater degree of shimming with shims 620.

Figure 9:
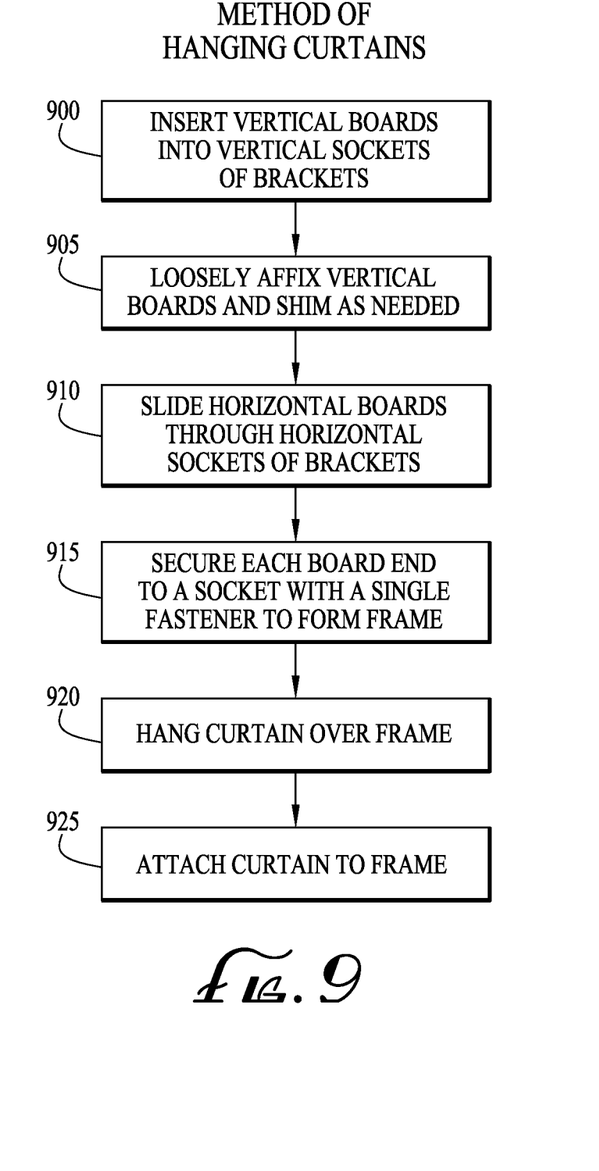
FIG. 9 is a flowchart of a tack room curtain hanging method of an illustrative embodiment.

FIG. 9 illustrates an exemplary method of hanging tack room display curtains. Before beginning, and as shown in FIGS. 6-8, vertical boards may be precut to 92 inches when used with 8 foot display curtains. Taking precut vertical boards to the show may save time and effort during curtain hanging. While stalls at various venues may vary, while using the system and apparatus of illustrative embodiments and with the height of the display curtains known, the height of the vertical boards may remain fixed from show to show.

Illustrative embodiments of assembling a tack curtain hanging frame 700 and hanging a tack curtain 815 from frame 700 will assemble a simple door frame 600 using an exemplary bracket system described herein. The entire description will further illustrate the assembly of frame 700 for one entire stall 705, but is repetitive of the description for assembling the door frame 600 and is therefore not included for clarity and so as not to obscure the invention. To assemble door frame 600 as shown in FIG. 6, first, at step 900 of FIG. 9, a first vertical board 630x is inserted into a vertically extending socket 110 of a first display curtain hanging tee bracket 100x. The vertical board 630x may slide into tee bracket 100x from below tee bracket 100x until the top of the vertical board 630x reaches line 150 (shown in FIG. 1). This vertical board 630x may be placed at the location where one side of door frame 600 is desired. If a vertical board 630 is desired at the bottom of frame 700 to produce a tighter curtain 815 appearance, then bracket is employed at the bottom of the vertical board, the bottom of vertical board 630 may seat into a bottom bracket for example either 90 degree corner bracket 200 or end bracket 500. Otherwise, the bottom of vertical board 630 may sit directly on the ground.

At step 905, the first vertical board 630x may be loosely affixed with zip ties until top rail 725 is installed. Vertical boards 630 may also be shimmed as needed at step 905 to clear doors and fixtures. Steps 900 and 905 may be repeated with a second vertical board 630y and a second tee bracket 100y at the location where the second side of door frame 600 is desired. Additional vertical boards 630 may similarly be placed as desired using the desired bracket type for the remainder of frame 700. Once all the vertical boards 630 have been installed at step 900 and loosely affixed and shimmed at step 905, at step 910, a first horizontal board 610x may be inserted through horizontally extending socket 120 in one of the tee brackets 100 to build top rail 725. In one example, horizontal board 610x may follow arrow 615 through tee bracket 100x until it reaches the position shown in FIG. 6. The first horizontal board 610x may slide through horizontal socket 120 of tee bracket 100x towards tee bracket 100y until one end of the board seats within horizontal socket 120 in each of tee bracket 100x and tee bracket 100y. Top rail 725 of the tee may initially be installed loosely to allow adjustments of the position of frame door 600. Additional horizontal boards 610 may additionally be placed through horizontal sockets of any additional brackets in frame 700. At step 915, the display curtain hanging tee brackets 100 and/or other brackets employed in frame 700 may be secured to each board 610, 630 seated within its respective sockets using fastener 740 to form a display curtain doorframe 600 and/or frame 700. Only one fastener 740 for each end of board may be required. At step 920, a tack curtain 815 may be hung over top rail 725 and/or frame 700. Finally, at step 925 tack curtain 815 may be attached to top rail 725, door frame 600 and/or frame 700 using attachment means 820.

Once all the upright vertical boards have been loosely installed using zip ties to hold them in place to the stall frames, the top rail boards 725 may then slide through the horizontal sockets 120 of tee brackets 100 and into double corner brackets 400 and/or corner brackets 200. FIG. 7 shows an installed top rail 725 of an illustrative embodiment. The top rail 725 may be installed by sliding horizontal boards 610 through horizontal sockets in the top brackets, and then securing each bracket with a single lap screw and/or fastener 740. In FIG. 8, curtains 815 may be hung around the top rails 725 and secured by Velcro, staples zip ties, or other temporary attachment means 820 known to those of skill in the art. The curtains 815 may then be attached to frame 700 in a crisp and tight manner, and may be well-placed and attached around joints 710 and corners 720.

Optionally, a floor board may be installed to create an even more precise, neat and tight fit. Bottom corner brackets 200 may be installed onto a bottom of vertical board 630, and an additional bottom horizontal board 610, so that frame 700 also has a board near the floor. Additionally and also optionally, an overhead banner frame may be assembled and hung across the stall aisle as described above. Where no floor board is employed, the bottom end of vertical boards 630 may seat into end brackets 500 and/or the floor.

Other portions of the display curtain hanging frame may be assembled separately, as described for the door frame of the method of FIG. 9, as desired. The entire frame may also be repeated in whole or in part over multiple stalls to form an entire aisle, stalls on both sides of an aisle, or an entire barn as needed and desired by the trainer, barn or stable using the system, apparatus, and method described herein. Details of the steps needed are repetitive and are therefore left to the understanding of the reader skilled in the art of carpentry or the art of assembling display curtain hanging frames.

The brackets of illustrative embodiments may hold corners together and create straight lines. Wood beams mating with the brackets may be precut and reused from show to show.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A system for hanging display curtains comprising:
a display curtain hung on a display curtain frame, the display curtain frame comprising a door frame;
a plurality of horizontal planks and a plurality of vertical planks, the plurality of horizontal planks and the plurality of vertical planks coupled together by a set of brackets to form the display curtain frame;
the set of brackets comprising a tee bracket and a corner bracket;
the tee bracket comprising:
a horizontal socket mated to an end of a particular one of the plurality of horizontal planks; and
a vertical socket mated to a top end of a particular one of the plurality of vertical planks, the top end aligned with a bottom of the horizontal socket;
a first single fastener coupling the top end of the particular one of the plurality of vertical planks to the vertical socket;
a second single fastener coupling the end of the particular one of the plurality of horizontal planks to the horizontal socket; and
wherein the corner bracket is a double corner bracket, and the vertical socket mates with two vertical planks, each plank of the two vertical planks arranged normally to one another.

2. The system of claim 1, wherein the set of display curtain hanging brackets further comprises an overhead banner bracket.

3. The system of claim 1, wherein the set of brackets comprises two tee brackets forming the door frame, each tee bracket of the two tee brackets mated to a vertical plank of the plurality of vertical planks, wherein one horizontal plank of the plurality of horizontal planks mates with and extends between each of the two tee brackets.

4. The system of claim 1, wherein the first fastener is a self-piercing lath screw engaged through a hole in the vertical socket.

5. A system for hanging display curtains comprising:
a display curtain hung on a display curtain frame, the display curtain frame comprising a door frame;
a plurality of horizontal planks and a plurality of vertical planks, the plurality of horizontal planks and the plurality of vertical planks coupled together by a set of brackets to form the display curtain frame;
the set of brackets comprising a tee bracket and a corner bracket;
the tee bracket comprising:
a horizontal socket mated to an end of a particular one of the plurality of horizontal planks; and
a vertical socket mated to a top end of a particular one of the plurality of vertical planks, the top end aligned with a bottom of the horizontal socket;
a first single fastener coupling the top end of the particular one of the plurality of vertical planks to the vertical socket; and
a second single fastener coupling the end of the particular one of the plurality of horizontal planks to the horizontal socket;
wherein the display curtain frame extends around a tack room stall; and
further comprising a shim between the particular one of the plurality of vertical planks and the tack room stall.

6. The system of claim 5, wherein each vertical plank of the plurality of vertical planks is about 92 inches long, and wherein the display curtain is 8 feet high when hanging.

7. The system of claim 5, wherein the set of brackets are made of rotationally molded polyethylene.

8. A curtain hanging method, comprising:
inserting a first vertical board into a first vertical socket of a first bracket from below the first bracket until a top end of the first vertical board is aligned with a bottom of a first horizontal socket extending through the first bracket;
affixing the first vertical board loosely to a stall;
repeating the inserting and the affixing with a second vertical board into a second vertical socket of a second bracket, the second bracket comprising a second horizontal socket;
sliding a horizontal board through the first and second horizontal sockets;
securing the top end of the first vertical board, the top end of the second vertical board and each side of the horizontal board to one of the first bracket or the second bracket using a single fastener,
hanging a curtain over the horizontal board; and wherein the first bracket is a tee bracket and the second bracket is a double corner bracket.

9. The curtain hanging method of claim 8, further comprising attaching the curtain to the horizontal board with an attachment means.

10. The curtain hanging method of claim 8, wherein a bottom of the first vertical board is seated in an end bracket.

11. The curtain hanging method of claim 8, wherein the first bracket and the second bracket are tee brackets.

12. A curtain hanging method, comprising:
inserting a first vertical board into a first vertical socket of a first bracket from below the first bracket until a too end of the first vertical board is aligned with a bottom of a first horizontal socket extending through the first bracket;
affixing the first vertical board loosely to a stall;
repeating the inserting and the affixing with a second vertical board into a second vertical socket of a second bracket, the second bracket comprising a second horizontal socket;
shimming the first and second vertical boards;
sliding a horizontal board through the first and second horizontal sockets;
securing the top end of the first vertical board the top end of the second vertical board and each side of the horizontal board to one of the first bracket or the second bracket using a single fastener; and
hanging a curtain over the horizontal board.

13. The curtain hanging method of claim 12, wherein the horizontal board forms a top rail of a frame.

14. The curtain hanging method of claim 12, wherein hanging the curtain over the horizontal board further comprises forming a frame around a tack stall with the vertical boards and the horizontal board, and hanging the curtain around the tack stall on the frame.

* * * * *